J. P. MENTZER.
STORAGE BATTERY.
APPLICATION FILED JAN. 14, 1918.
1,285,303.
Patented Nov. 19, 1918.
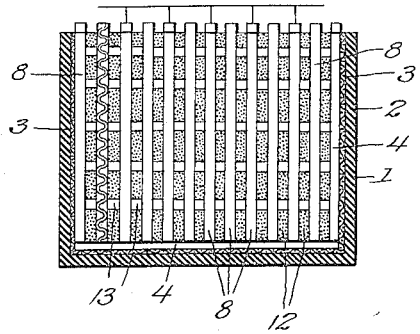
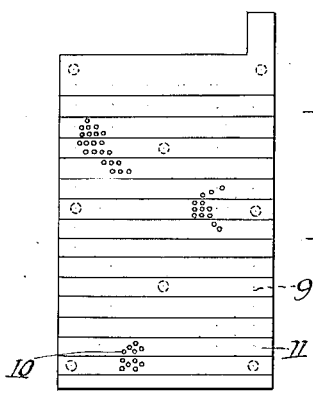
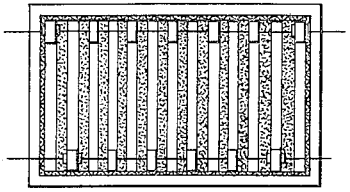
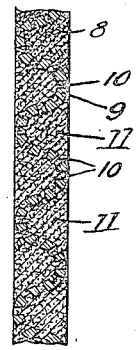
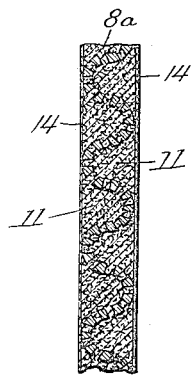
Witnesses:
Arthur W. Carlson
Robert H. Wein
Inventor
John P. Mentzer

UNITED STATES PATENT OFFICE.

JOHN P. MENTZER, OF CHICAGO, ILLINOIS.

STORAGE BATTERY.

1,285,303.

Specification of Letters Patent.   Patented Nov. 19, 1918.

Application filed January 14, 1918.   Serial No. 211,707.

*To all whom it may concern:*

Be it known that I, JOHN P. MENTZER, a citizen of the United States, residing at Chicago, in the county of Cook and State of Illinois, have invented a certain new and useful Improvement in Storage Batteries, of which the following is a full, clear, concise, and exact description, reference being had to the accompanying drawings, forming a part of this specification.

My invention relates to storage batteries and especially to storage batteries of the "dry" type.

The principal object of the invention is to provide a practical and effective dry storage battery.

Other objects are to secure a high degree of efficiency and a low expense of manufacture and maintenance.

Still further objects of the invention are to provide an effective and inexpensive type of container for the battery and a novel and advantageous process of making same.

In the accompanying drawings Figure 1 is a cross section of a storage battery embodying my present invention;

Fig. 2 is a plan view of the same;

Fig. 3 is an elevation of one of the plates of the battery;

Fig. 4 is a cross section of a portion of said plate;

Fig. 5 is a similar cross section of a modified form of plate.

Referring to the drawings I show a dry storage battery having a container 1 which may be of any desired shape or form. This container 1 is of special construction having particular advantages. It is a composite structure having both strength and lightness combined with high insulating qualities and imperviousness to the attack of acid. To such end it has an outer portion 2 consisting of a layer of suitable material, which is preferably light insulating material, such as pasteboard or wood, although it may be metal if desired. Within this is a layer of reinforcing material 3, which may be in the form of a wire screen or similar material. Within this layer 3 is a still further layer 4 of acid proof material, such for example as some asphaltum or petroleum compound. The container thus composed has the features mentioned, namely it is strong and well reinforced, and at the same time its interior wall or lining is a material which will not yield to the attack of the acid contained by the battery.

As a preferred arrangement this container may be made by first constructing the wall 1 and lining the same with the reinforcing layer 3 and then introducing the asphaltum or petroleum compound in a hot condition and then introducing a plunger by which the compound may be spread out and caused to line the walls of the container and cool the same so as to harden. The plunger may be water cooled.

Within the container 1 the battery portion proper is arranged. This consists of a series of positive and negative plate members 8 arranged side by side in vertical order. As best shown in Fig. 4 each plate member 8 consists of a lead plate 9 made in ordinary cast grid form or in corrugated form, as shown and provided with a series of apertures or openings 10—10. Active material 11 is filled into the apertures 10 and also filled into the corrugations in the plate on both sides thereof so as to make a smooth wall surface along the edges of the corrugations.

Between the plates 8—8 there are separating members 12—12 which are of special and advantageous construction. These consist of diatomaceous material, such for example as kieselguhr or similar product. This material is provided with an acid such as sulfuric acid and may be in the form of either a stiff paste or of a plate or slab. In some cases some fiber would be combined with the diatomaceous material. The separator thus formed is exceedingly inert, thus resisting completely the action of the acid. Furthermore, it is exceedingly porous and absorptive and absorbs and holds the acid in a very advantageous and efficient manner. Furthermore, it is a very good insulator which is highly desirable in a separator of this sort.

Kieselguhr alone may be used or some grade of kieselguhr such as B. H. celite, or it may be combined with calcium sulfate or with calcium sulfate and fiber.

In addition to the separators 12—12 there may also, if desired, be mechanical separators 13 which may be glass beads, glass rods, rubber rods, or some similar device.

In Fig. 5 I show a modified form of plate member 8ª in which there is added to the plate member 8 of Fig. 4, layers 14 of tin foil or similar material extending along the opposite sides of the active material 11.

A storage battery thus constructed will prove very advantageous, giving a very high degree of efficiency. This I find from actual practice.

The term "dry" in this application is used in the sense that the acid in the battery is non-flowing, it being held absorbed in the separators.

It will be understood that changes and modifications may be made without departing from the spirit of the invention.

What I claim is:

A dry storage battery having separators composed of kieselguhr combined with calcium sulfate and fiber.

In witness whereof, I hereunto subscribe my name this 10th day of January, A. D. 1918.

JOHN P. MENTZER.